July 17, 1962
J. AMATO
3,044,602
BUCKET CONVEYOR
Filed April 22, 1957
4 Sheets-Sheet 1
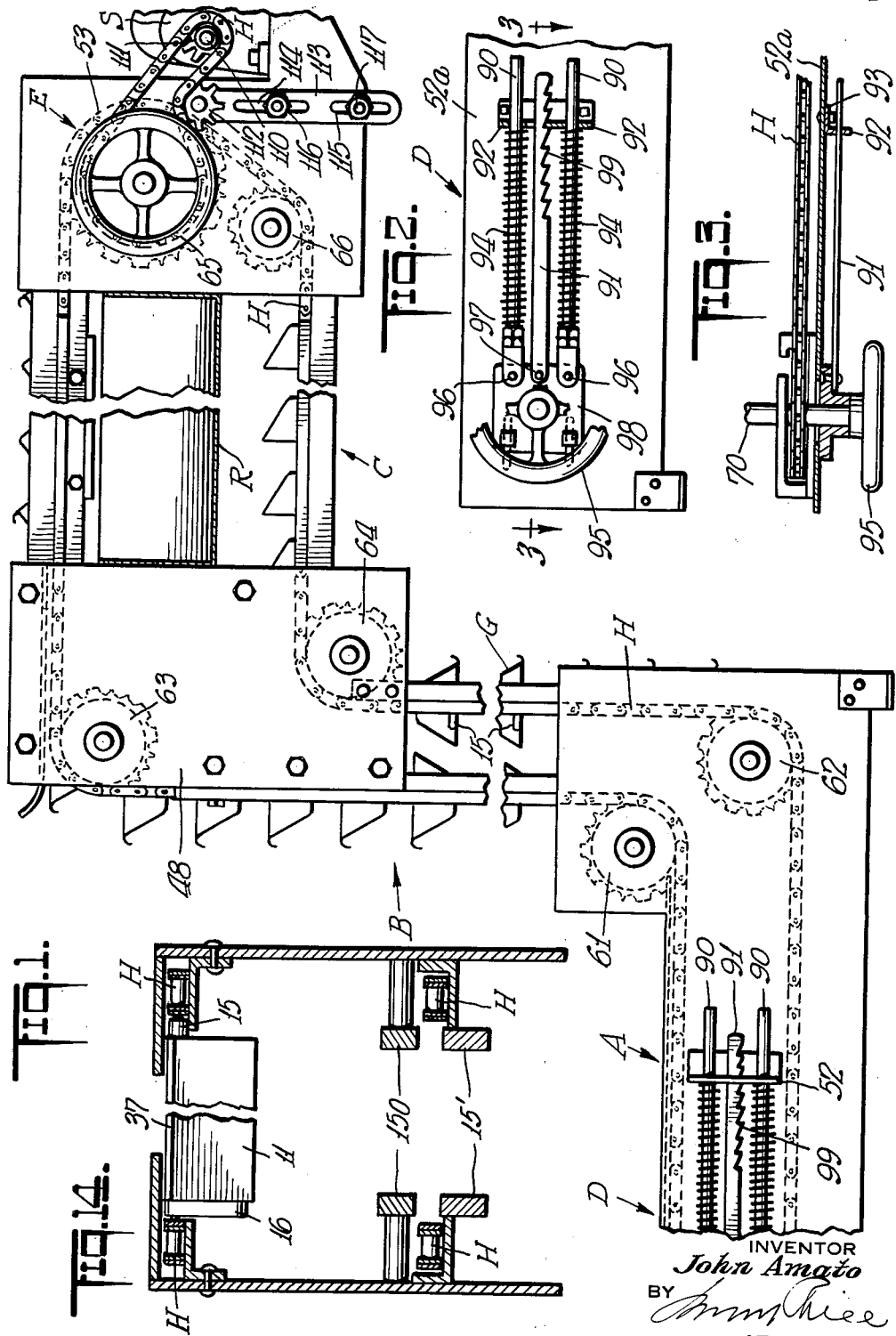
INVENTOR
John Amato
BY
ATTORNEY July 17, 1962  J. AMATO  3,044,602
BUCKET CONVEYOR
Filed April 22, 1957  4 Sheets-Sheet 2
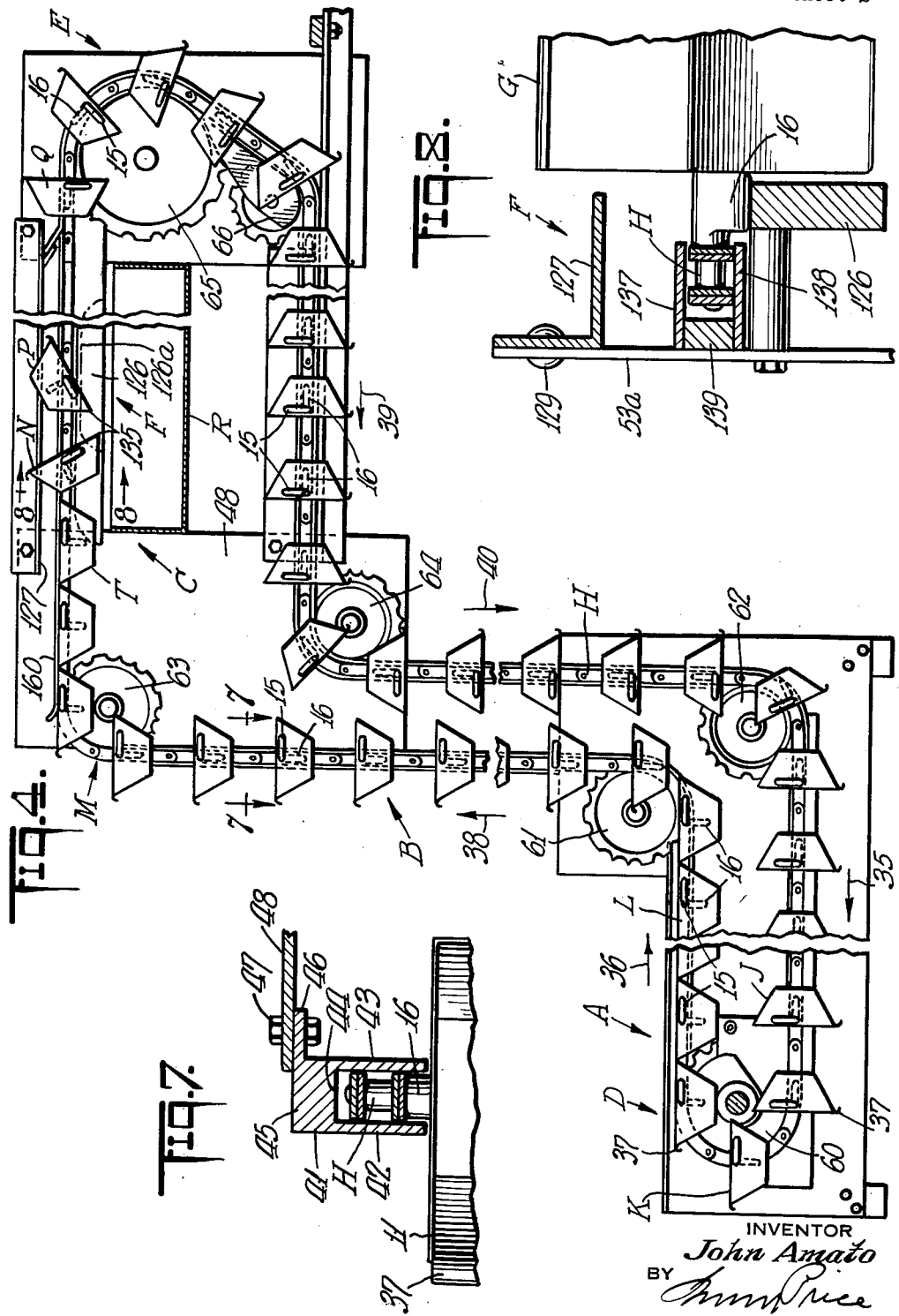
INVENTOR
John Amato
BY
ATTORNEY

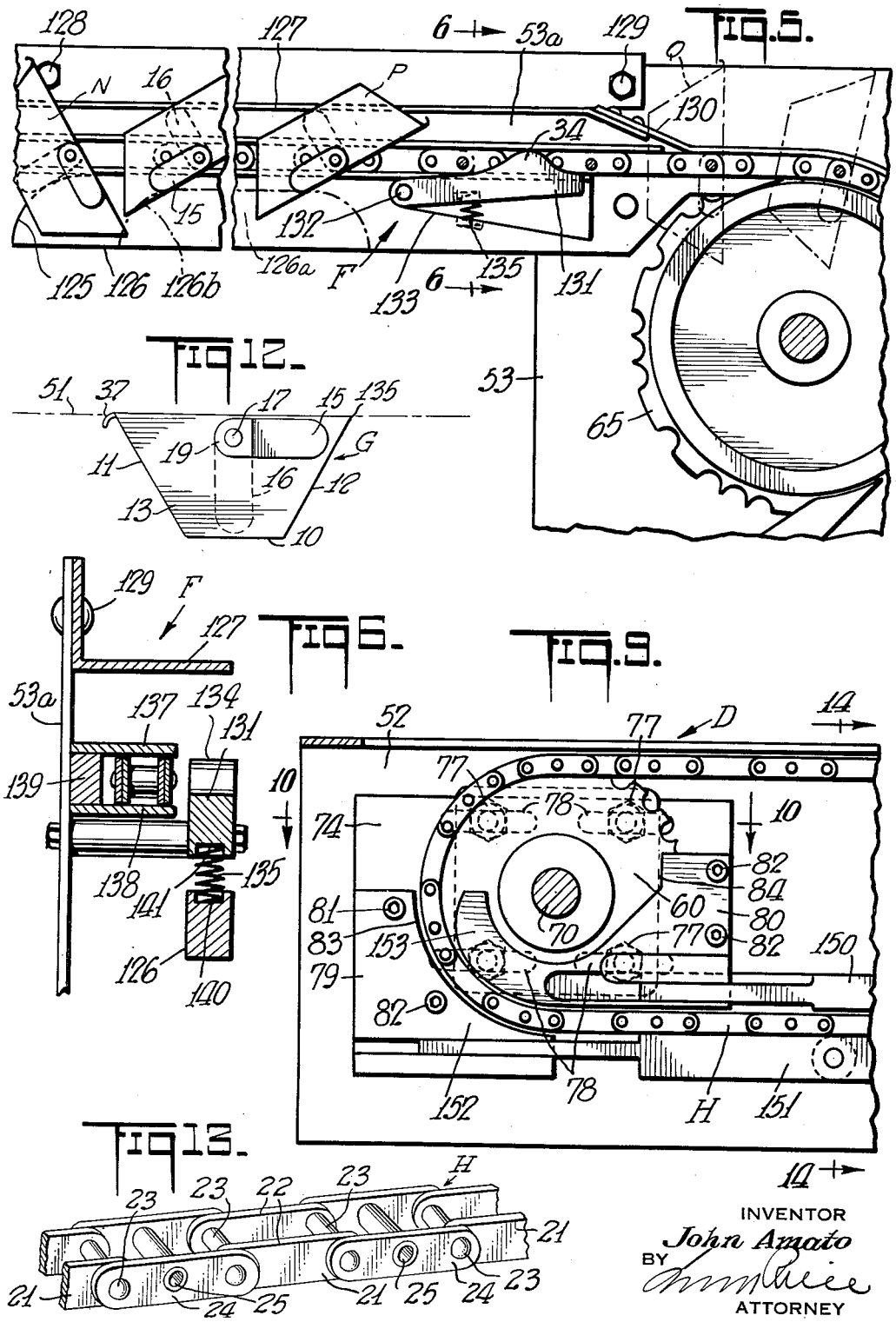

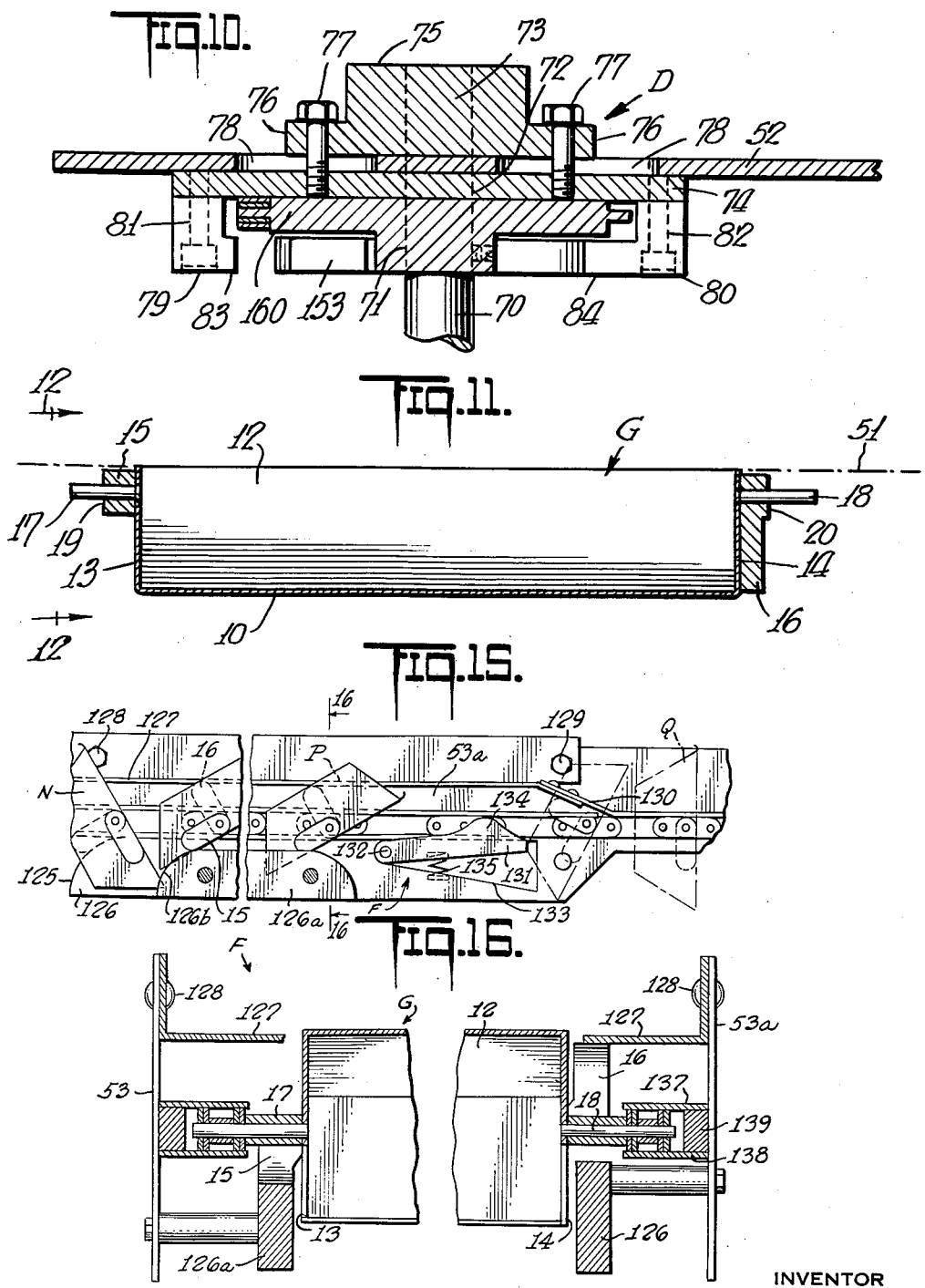

United States Patent Office 3,044,602
Patented July 17, 1962

3,044,602
BUCKET CONVEYOR
John Amato, Brooklyn, N.Y.
Filed Apr. 22, 1957, Ser. No. 654,152
11 Claims. (Cl. 198—145)

The present invention relates to a bucket conveyor and particularly relates to a conveyor which may be employed for carrying fragmented particular granular or divided materials to various positions in and around a manufacturing, merchandising or warehousing establishment.

It is among the objects of the present invention to provide a novel, low cost, durable bucket conveyor of the character described, which may be set up to any desired height or size from standard parts, and which may be readily extended laterally over long floor spaces so that it may extend from floor to floor over a considerable height.

Another object is to provide a novel bucket conveyor of the character described which will be reliable in its operation and which may be readily adjusted to dump divided materials at predetermined points, and which will require a minimum of maintenance and will be durable in its operation regardless of dust, dirt or passage into various areas or room spaces or different climatic conditions.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a bucket conveyor of the type having a large number of closely spaced elongated pans, one side of which is provided with an overhanging inverted channel lip to engage the next bucket conveyor and thus form a continuous receptacle when the conveyor is being filled. Desirably each side of one of these elongated bucket conveyors or pans is provided with a cam follower means positioned at right angles to each other.

In the preferred form of the invention the buckets are each mounted upon a chain which will carry them in series relationship from points of filling to points of dumping with the position of the buckets being controlled by cam follower means thereof in relation to the cams which are adjustably mounted upon the track system.

The particular feature of the present invention resides in the fact that the chain conveyor with its associated tracks and bucket may be made with any length or height and positioned most conveniently to accommodate itself to the installation on which or to which it is to be positioned.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations, and modifications can be resorted to which fall within the scope of the claims hereunto appended.

In the drawings wherein like reference characters denote corresponding parts throughout the several views:

FIG. 1 is a side elevational view of one form of the bucket conveyor according to the present invention.

FIG. 2 is a fragmentary end side elevational view showing the manner of adjusting the tension on the bucket carrier chain.

FIG. 3 is a transverse sectional view upon the line 3—3 of FIG. 2.

FIG. 4 is a side elevational view similar to FIG. 1 but with the side track structure removed more clearly to show the positioning of the buckets and their manipulation according to their cam and cam follower arrangements.

FIG. 5 is a fragmentary side elevational view showing the upper right hand part of FIG. 4 upon an enlarged scale and also showing the track arrangement in greater detail.

FIG. 6 is a transverse fragmentary sectional view upon the line 6—6 of FIG. 5, showing the track arrangement.

FIG. 7 is a fragmentary transverse horizontal sectional view taken upon the line 7—7 of FIG. 4, showing the track arrangement.

FIG. 8 is a fragmentary transverse vertical view taken upon the line 8—8 of FIG. 4, showing the track arrangement in an enlarged scale.

FIG. 9 is side elevational view with the outer casing removed from the structure to the lower left hand corner of FIGS. 1 and 4, showing the adjustable chain sprocket.

FIG. 10 is a fragmentary transverse horizontal sectional view upon the line 10—10 of FIG. 9.

FIG. 11 is a transverse vertical sectional longitudinal view of one of the buckets of the bucket conveyor upon an enlarged scale as compared to FIG. 4.

FIG. 12 is an end elevational view of the bucket of FIG. 11 taken from the line 12—12 of FIG. 11.

FIG. 13 is a fragmentary top perspective view of a portion of the chain conveyor.

FIG. 14 is a transverse sectional view taken upon the line 14—14 of FIG. 9.

FIG. 15 is a side sectional view similar to FIG. 5, but at the opposite side of the bucket conveyor.

FIG. 16 is a transverse vertical sectional view taken along line 16—16 of FIG. 15.

Referring to FIGS. 1 and 4 the conveyor structure generally consists of a loading section A, a transportation section B, and a dumping section C.

The loading section A may be positioned on the bottom or delivery floor of a food manufacturing plant, as for example where the bucket conveyor is to pick up and receive beans of various types, shapes or sizes, or granulated or round materials or even grains or seeds of various types and descriptions, which are dumped on the conveyor at a relatively low level adjacent to the delivery doors from bags, barrels, or other shipping receptacles.

The divided or granular material is then to be conveyed to a fairly high position in the plant, as for example to the third, fourth or fifth floors, where it is to be processed, returning during the course of the processing back to the first floor.

The bucket conveyor of the present invention is designed to pick up the beans, grains, or other divided granular material on the first floor by the bucket conveyor section A, and then carried to the third, fourth or fifth floors by the bucket conveyor section B, finally dumped at a high point by the bucket conveyor section C.

The length of the sections A, B and C may be varied as may also the inclination thereof to accommodate the loading and dumping positions desired whether that be on the same floor or separated by a number of floors of considerable heights, or whether that be substantially one above the other or be displaced by a considerable distance.

Referring again to FIGS. 1 and 4, the conveyor system itself is provided with an adjustable sprocket D shown in a small scale in FIGS. 1 and 4, and also shown in detail in FIGS. 2, 3, 9 and 10.

At the other end there is shown a driving mechanism E, which is shown best in FIG. 1.

The dumping cam arrangement F is best shown in FIGS. 4, 5, 6 and 8.

The buckets G are shown best in FIGS. 11 and 12 and the chain H is shown best in FIG. 13, each referring to FIGS. 11 and 12.

The buckets G may take a wide variety of shapes and forms and they are provided with bottom walls 10, inclined side walls 11 and 12 and end walls 13 and 14. The depth of the bottom wall 10, the length of the bucket and the shape of the side walls 11 and 12 may be considerably varied.

The essential features according to the present invention resides in the opposite cam follower members 15 and 16 with the shafts 17 and 18 which act both to carry the bucket upon the chain and to enable its rotation by the coaction of the cam followers 15 and 16, and the cams upon the track structure forming part of the bucket conveyor section A and the bucket conveyor section C.

It will be noted that the opposite cam follower elements 15 and 16 are positioned 90° apart although both are centered upon the shaft 18 and 19, which constitute the longitudinal shaft of the bucket G.

Each of the cam follower members 15 and 16 are provided with the bosses or projecting portions 19 and 20 which ride along the sides of the track and keep the bucket in the centered position.

The chain as shown in FIG. 13 has the connecting links 21 with the side walls 22 and the end pin connections 23.

The chain H as shown in FIG. 13 also has the bucket carrying links 24, which have central tubular members 25 receiving the pivot pins or rods 17 and 18 of the bucket G.

The pivot pins 23 will pivotally connect the sections 21 and 24 of the chain H together.

Returning to FIGS. 1 and 4, it will be noted that the chains will carry one bucket at each tube 25 on the links 24 and the positioning of these buckets will be controlled by the cam follower members 15 and 16, and the cam actuator which may be positioned upon the track sections A, B and C.

In the lower sections, as shown in FIG. 4, the buckets will be in half inverted vertical position and passing in the direction 35 as indicated at J.

As they turn at position K, in FIG. 4, they will return to horizontal position as indicated at L, and then they will follow the direction of the arrow 36.

In the horizotal position shown in L, the overhanging lips 37 will engage the successive buckets so that in position L there will be no space between the buckets and any beans or granular material dumped into the buckets will be received therein.

In ascending at 38 the buckets being full will retain their horizontal position and they will continue in horizontal position as they turn at position M and pass into the dumping position at F.

At the position F the buckets will first be turned partly to vertical position as indicated at N, and then they will be substantially turned over as indicated at position P, and then return to vertical position as indicated at Q, when they have completed the dumping in the chute or take-off R.

From the position Q the buckets will then pass the driving mechanism E and they will then return as indicated at 39 and 40 in being held in vertical position to the loading position D (see FIG. 4).

The position of the bucket during this traveling is controlled by the track structure as for example is best shown in FIG. 7.

At one or both sides of the track there will be positioned the guide ways 41, which have outstanding flanges 42 and 43 to form the recess 44.

The base 45 of the track guide section 41 has a flange 46, which is bolted at 47 to the plate 48 forming part of the frame structure. The chain structure H will ride through the recess 44 between the side walls 42 and 43.

Where the side walls extend over sufficiently as indicated at 39 and 50, they will not only receive the chain but also will receive the cam follower member 16 on the side of the bucket facing the observer in FIG. 4.

This will result in the bucket during its movement upwardly in the direction 38 being held in horizontal position as indicated at FIG. 4.

A similar arrangement may be provided to hold the bucket in vertical position as it moves in directions 39 and 35 to the left, and as it moves in direction 40 downwardly.

In all these positions the track guide structure as shown in 49 and 50 will engage the vertical cam follower 16 holding the bucket so that the plane of its upper mouth section will be transverse to the track.

When, however, the bucket is to be held so that its mouth plane is parallel to the track, the other side of the track will have the projections 49 and 50, which will engage the cam follower 15.

This takes place in position L during run 36 as shown in FIG. 4.

The horizontal mouth plane is indicated by the dot and dash lines 51 in FIGS. 11 and 12.

It will be noted that the side plate 52 in section A, and 48 at the beginning of section C, and 53 at section E of the bucket conveyor will have suitable guide track arrangements to cause the bucket to turn as it passes over the sprocket 60, the sprockets 61 and 62, the sprockets 63 and 64, and the sprockets 65 and 66.

The sprocket 60 permits adjustment and tensioning of the chain so that the chain H will always be taut. This arrangement is best shown in FIGS. 1, 2, 3, 9 and 10.

The sprocket 60 none of which is positioned on each side of the machine will be carried upon the shaft 70 (see FIGS. 9 and 10).

The shaft 70 is carried and extends through the opening 71 and sprocket 60 and has bearings at 71 and 73 in the plate 74 and in the end cap 75, respectively.

The end cap 75 has the flanges 76 which are bolted at 77 upon the plate 74.

The bolt 77 extends through the slots 78, four of which are positioned on each side of plate 52. Also bolted to the plate 74 are the extension members 79 and 80 by the bolts 81 and 82.

The inturned end portions 83 and 84 (see FIG. 10) extend over the edges of the sprocket wheels 60.

Since the sprocket wheels 60 are carried by the adjustable plate 74, they may be readily adjusted by means of arrangement shown in FIGS. 2 and 3.

This arrangement consists of the guide rods 90 and the intermediate ratchet stick 91, which extend through the flange 92 of the angle member 93 mounted on the plane 52A.

The rods 90 carry the springs 94 on the shaft 70 positioned at hand wheel 95, which when turned will permit the ratchet rod 91 to be lifted from its locked position in FIG. 2, and move to another position taking up any slack in the chain.

It will be noted that the rods 90 and the ratchet stick 91 are pivotally mounted or connected at 96 and 97 on the plate 98, which in turn is movable in respect to the plate 52A.

In this way it is possible to take up any slack in the chain at the mounted position A, which may be accomplished by taking up on the teeth 99 on the ratchet stick 91.

Referring to the driving position E shown best in the upper right hand side of FIG. 1, the motor S has a shaft 110 carrying the sprocket 111, which drives the chain H.

The chain passes over the adjustable sprocket 112 which is carried on the adjustable member 113.

The adjustable member 113 has the slots 114 and 115 and which may be locked to position by the bolts 116 and 117 on the side plane 53.

This take up 112 to 117 cooperates with the take up shown in FIGS. 2, 3, 9 and 10, which maintains the tautness of the chain H and both sides of the mechanism.

In dumping position F, the buckets are turned as indicated from the horizontal position T (see FIG. 4) to the partly inclined position N to the inverted position and finally to the vertical position Q.

This is accomplished by means of the cam arrangement shown best in FIG. 5 and also in FIGS. 15 and 16.

The remote vertical cam follower 16 of FIG. 5 will strike the curve portion 125 of the cam plate 126 which is mounted upon the side plate 53. This will cause the bucket to take position N then the follower 15 will strike the cam 126a on the surface 126b.

When this occurs the bucket will be turned from position T to position N.

When cam follower 15 strikes the initial curved portion 126b of cam 126a the bucket is moved from position N to position P and further rotation is stopped by engagement of the end of cam follower 16 and the track or guide 127.

The hump 134 of latch 131 strikes cam follower 16 and jars the bucket to be certain that all additional material is removed therefrom.

Then inclined surface 130 constituting a continuation of track 127 engages cam follower 16 to move the bucket to vertical position.

During this final movement cam follower 15 is free.

The upper guide rail 127 will be contacted at the bottom end of the cam 16 when the bucket is in the position P. The rail 127 is held in position on the side plate 53a by means of the bolts 128 and 129.

Then the inclined track portion 130 will contact the cam follower 16 and will cause the buckets to be moved in the position Q.

In moving from position T to N (see FIGS. 4 and 5) cam element 16 engages surface 126b and changes from position as shown at T to position as shown at N.

During the course of travel along cam 126a the cam element 15 at opposite end of bucket from cam 15 engages cam 126a also at opposite end of bucket.

While element 15 travels along cam 126a the cam element 16 is guided in a track 127 thus preventing bucket from completely turning over.

FIG. 15 shows the cam element 15 in engagement with the cam 126a and in the overturned position P which is the extreme overturned position.

Also shown in FIG. 15 is the cam element 16 in track 127.

Thus movement to vertical position (position Q) is positively accomplished by the track portion 130.

Referring to FIGS. 6 and 8, it will be noted that the chain H rides between the plates 137 and 138 which are below the flange 127.

These guide plates 137 and 138 are spaced by the block 139, and they are mounted upon the side plate 53A.

The latch 131 receives a spring 135 as shown in FIGS. 5 and 6 and at its lower end is received in the recess 140 in the plate 126, and at its upper end is received in the recess 141 on the latch member 131.

The camming arrangement which turns the buckets from position J through position K to position L is best shown in FIG. 9.

As shown in FIG. 9, the cam follower 16 will be guided between the track members 150 and 151 as the buckets are being carried along by the chain H.

These buckets then will be guided around the cam plates 152 and 153 which have the effect of turning the bucket from vertical position as shown in J to horizontal position as shown in K.

Then as the bucket moves upwardly the lips 37 will engage so that the buckets may be loaded in loading position A.

In operation the bucket conveyor will receive materials at loading position A and elevate them to dumping position F.

In loading position D the buckets will be engaged with one another by means of the lips 37 so that there will be no space between them and they will be carried horizontally at 38 and up to the dumping position F where they will be dumped and moved back to vertical positions indicated at Q, then the buckets in inverted vertical position will be carried back to loading position D.

The chains H on each side of the conveyor may be kept taut by the adjusting wheel 95 and the vertical adjusting rod 113.

The dumping arrangement shown in FIG. 5 will successfully move the buckets from position T to position N to position Q as shown in FIG. 4.

The track structures as indicated in FIG. 7 will guide the buckets by either the follower 15 or the follower 16.

The follower 16 is used where the bucket is being guided so that the mouth plane 51 is transverse to the direction of movement.

The cam follower 15 is used where the mouth plane is parallel to the direction of travel.

In addition to guiding the buckets by means of the guide rails, it is also possible to guide them by the plates 160, as indicated in FIG. 4, which will ride on mouth portions of the buckets and hold them horizontal as they approach the dumping position at F.

The side walls of the buckets G which carry the separate cam elements 15 and 16 may be referred to as end walls or ends of the bucket since the side walls of the bucket are oblique. These separate follower or cam elements during the entire travel of the buckets hold the bucket in position so that it will be in horizontal position as shown at A and B in moving from filling to dumping position and thereafter will be returned in vertical position as indicated at 39, 40 and 35 in FIG. 4.

The cam follower elements or the control elements 15 and 16 serve to control the position of the bucket throughout its travel and to reverse it from vertical to horizontal at the filling position A in FIG. 1 and then dumping it as indicated at N and P at the top of FIG. 4 with the bucket then being conveyed in vertical position from position Q at the upper right of FIG. 4 down to the loading position D at the lower left of FIG. 4. A change of 90° takes place at the dumping position at the top of FIG. 4 and at the loading position at D at the lower left of FIG. 4.

It is thus apparent that the applicant has provided a novel bucket conveyor arrangement which may be employed for transporting granular, grainlike or beanlike materials to various positions in or around the factory or food processing establishments, with assurance that the loading or dumping operations will take place at predetermined positions.

As many changes could be made in the above bucket conveyor, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A bucket conveyor of the type in which the laterally elongated buckets with downwardly converging oblique front and back side walls and vertical ends and having separately positioned elongated projections on the exterior vertical ends offset in respect to each other and with tracks cooperating with said projections continuously to position the buckets upright in horizontal position from filling position to receive and carry the material to be conveyed to dumping position wherein the buckets are turned to a substantially inverted position at an angle of about 180° away from said horizontal filling position, and thereafter the buckets are turned to a vertical position 90° away from filling position and are carried in this last mentioned position from dumping position to filling position comprising a frame structure having tracks and having a loading position, an intermediate connecting conveying arrangement and a dumping position, a plurality of spaced buckets, conveying members carrying said buckets and means to control the positions of said buckets at the loading, intermediate and dumping positions, said last mentioned means including follower projections on each end of the buckets at right angles to each other and tracks and cams to contact said projections to hold the buckets in position transverse to the conveying members except in dumping position and then to successively turn the buckets over at dumping position and then restore their normal transverse position.

2. A bucket conveyor of the type in which the laterally elongated buckets with downwardly converging oblique front and back side walls and vertical ends and having separately positioned elongated projections on the exterior vertical ends offset in respect to each other and with tracks cooperating with said projections continuously to position the buckets upright in horizontal position from filling position to receive and carry the material to be conveyed to dumping position wherein the buckets are turned to a substantially inverted position at an angle of about 180° away from said horizontal filling position, and thereafter the buckets are turned to a vertical position 90° away from filling position and are carried in this last mentioned position from dumping position to filling position comprising a frame structure having tracks and having a loading position, an intermediate connecting conveying arrangement and a dumping position, a plurality of spaced buckets, conveying members carrying said buckets and means to control the positions of said buckets at the loading, intermediate and dumping positions, said control means consisting of follower projections positioned on opposite side of said buckets, and cam plates being positioned at said loading and dumping, said last mentioned means including follower projections on each end of the buckets at right angles to each other and tracks and cams to contact said projections to hold the buckets in position transverse to the conveying members except in dumping position and then to successively turn the buckets over at dumping position and then restore their normal transverse position.

3. A bucket conveyor of the type in which the laterally elongated buckets with downwardly converging oblique front and back side walls and vertical ends and having separately positioned elongated projections on the exterior vertical ends offset in respect to each other and with tracks cooperating with said projections continuously to position the buckets upright in horizontal position from filling position to receive and carry the material to be conveyed to dumping position wherein the buckets are turned to a substantially inverted position at an angle of about 180° away from said horizontal filling position, and thereafter the buckets are turned to a vertical position 90° away from filling position and are carried in this last mentioned position from dumping position to filling position comprising a frame structure having tracks and having a loading position, an intermediate connecting conveying arrangement and a dumping position, a plurality of spaced buckets, conveying members carrying said buckets and means to control the positions of said buckets at the loading, intermediate and dumping positions, said buckets consisting of elongated trays of diverging triangular cross section downwardly with end follower projections, said last mentioned means including follower projections on each end of the buckets at right angles to each other and tracks and cams to contact said projections to hold the buckets in position transverse to the conveying members except in dumping position and then to successively turn the buckets over at dumping position and then restore their normal transverse position.

4. A bucket conveyor of the type in which the laterally elongated buckets with downwardly converging oblique front and back side walls and vertical ends and having separately positioned elongated projections on the exterior vertical ends offset in respect to each other and with tracks cooperating with said projections continuously to position the buckets upright in horizontal position from filling position to receive and carry the material to be conveyed to dumping position wherein the buckets are turned to a substantially inverted position at an angle of about 180° away from said horizontal filling position, and thereafter the buckets are turned to a vertical position 90° away from filling position and are carried in this last mentioned position from dumping position to filling position comprising a frame structure having tracks and having a loading position, and intermediate connecting conveying arrangement and a dumping position, a plurality of spaced buckets, conveying members carrying said buckets and means to control the positions of said buckets at the loading, intermediate and dumping positions, said buckets being provided with outwardly extending pivot members and said conveying members having receptacles to receive such members, said last mentioned means including follower projections on each end of the buckets at right angles to each other and tracks and cams to contact said projections to hold the buckets in position transverse to the conveying members except in dumping position and then to successively turn the buckets over at dumping position and then restore their normal transverse position.

5. A bucket conveyor of the type in which the laterally elongated buckets with downwardly converging oblique front and back side walls and vertical ends and having separately positioned elongated projections on the exterior vertical ends offset in respect to each other and with tracks cooperating with said projections continuously to position the buckets upright in horizontal position from filling position to receive and carry the material to be conveyed to dumping position wherein the buckets are turned to a substantially inverted position at an angle of about 180° away from said horizontal filling position, and thereafter the buckets are turned to a vertical position 90° away from filling position and are carried in this last mentioned position from dumping position to filling position comprising a frame structure having tracks and having a loading position, and intermediate connecting conveying arrangement and a dumping position, a plurality of spaced buckets, conveying members carrying said buckets and means to control the positions of said buckets at the loading, intermediate and dumping positions, said control means consisting of a plurality of follower projections to keep the buckets upright at the loading position and to invert them at the dumping position, said last mentioned means including follower projections on each end of the buckets at right angles to each other and tracks and cams to contact said projections to hold the buckets in position transverse to the conveying members except in dumping position and then to successively turn the buckets over at dumping position and then restore their normal transverse position.

6. A bucket conveyor of the type having a lower loading section, intermediate upwardly and downwardly extending transportation sections and an upper dumping section comprising a conveyor system having a sprocket chain and a track system extending through said sections, a driving mechanism to drive said chain and a plurality of transversely elongated buckets carried by said chain having elongated cam follower bars thereon positioned at an angle of 90° to each other at opposite sides of the buckets, said track system having parallel closely spaced tracks extending continuously along said sections and receiving and guiding at least one of said follower bars, and cam means on said track system to hold said bucket upright in said loading section, to overturn the bucket at said dumping section and to hold said bucket upright with its load in the upwardly extending transportation section and transversely to the direction of travel in the downwardly extending intermediate section.

7. The conveyor of claim 6, a spring pressed swinging cam to strike the bucket when in said dumping section to cause any residual material to be dumped therefrom.

8. A bucket conveyor having a plurality of laterally elongated shallow buckets with vertical end walls and downwardly converging front and back side walls and a flat bottom wall and having a conveyor system with a horizontally positioned lower loading section, an elongated vertical conveying section and an upper horizontally positioned dumping section, separate independent cams on the vertical end walls of said buckets to control the position of the buckets by holding them in horizontal loading position at the loading section and when moving vertically from loading position to dumping position by holding them in vertical position at 90° away from horizontal loading position in moving from upper dumping position to lower loading position, said conveyor having tracks extending through said loading, conveying and dumping sections and said cams following the tracks substantially continuously throughout the travel of the buckets to hold said buckets in said horizontal and said vertical positions and additional elongated track means to act on said cams at said dumping section to successively partly and then substantially fully to invert said buckets and then to turn said buckets to vertical position during and after passage through said dumping section.

9. The conveyor of claim 8, said cams consisting of elongated bars positioned transversely oppositely on the vertical end walls, one bar on each bucket being positioned vertically to the flat bottom wall and the other bar being positioned horizontally adjacent to the top of the bucket and parallel to the flat bottom wall and said tracks consisting of closely spaced parallel track elements between which said bars are received and positioned during their travel through the loading, conveying and dumping sections.

10. The conveyor of claim 8, one of said cams on each bucket cooperating with said tracks to hold said bucket in horizontal position in the loading and dumping sections in moving from loading to dumping position and the other cam on each bucket being effective to hold the bucket in horizontal position in said vertical conveying section and said second mentioned cams being effective to hold said buckets in vertical position in return of the empty buckets from loading position through the vertical conveying section and to the horizontally positioned loading section.

11. The conveyor of claim 8, said dumping section being provided with spring lever means to yieldably strike said buckets in passing through said dump section to dump any residue therefrom.

References Cited in the file of this patent
UNITED STATES PATENTS

| | | |
|---|---|---|
| 620,298 | Frith | Feb. 28, 1899 |
| 620,299 | Frith | Feb. 28, 1899 |
| 639,655 | Berghoefer | Dec. 19, 1899 |
| 2,435,498 | Hapman | Feb. 3, 1948 |